C. H. White,
Butter Tub.

No. 113,122. Patented Mar. 28, 1871.

Witnesses:
George B. Peters
S. S. Peters

Inventor.
Charles H. White

United States Patent Office.

CHARLES H. WHITE, OF EMMETT TOWNSHIP, MICHIGAN.

Letters Patent No. 113,122, dated March 28, 1871.

IMPROVEMENT IN BUTTER-TUBS.

The Schedule referred to in these Letters Patent and making part of the same.

I, CHARLES H. WHITE, of the township of Emmett, in the county of Calhoun and State of Michigan, have invented certain Improvements in Butter-Tubs, of which the following is a specification.

Nature and Objects of the Invention.

The main object of my invention is to so pack butter that it shall be entirely surrounded by a thin sheet of brine, whereby its sweetness will be preserved for a long time. To this end—

The invention consists in the construction of a conical butter-tub with tight heads, and brine-hole and plug in the small one, so that the tub may be reversed endwise in position, the large head serving as the bottom, and the small head the top, or *vice versa*, as the nature of my improved packing and other operations may require, the main object being to effect, by the reversal of the tub, a certain end motion to the conic frustum of packed butter within, so that it can be surrounded with a thin annular sheet of brine, which, with other details of construction for the more perfect manipulation and preservation of the packed butter, will hereinafter be more fully explained.

Description of the Accompanying Drawing.

General Description.

The form and construction of my improved butter-tub A is shown by *a*, which indicates the staves.

H the larger, and H' the smaller head, which has a hole in it to admit brine, said hole being stopped when necessary by a plug, *p*.

My peculiar and improved mode of preserving the butter sweet and fresh necessitates a modified form and different construction from ordinary butter-tubs with covers.

The staves *a* are straight, and built up with close joints in the shape of a conical frustum, of ample taper to permit the end movement and separation of the butter, as hereinafter provided, and both heads should be tightly fitted, the whole being well hooped, so as to be water-tight.

The material should be of the first quality and most suitable kind; and I find it best to turn the surfaces, (pail fashion,) making the interior especially smooth, and such extra cost will not be onerous, for my mode of keeping the butter does not deteriorate the tub, which may be used over and over again until worn out.

A description of my process for preserving the butter will fully explain the peculiar constructional requirements of this kind of tub.

Figure 1:
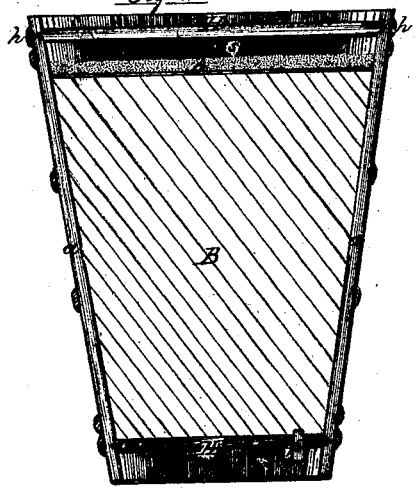
Figure 1 is a vertical central section of the tub and packed contents, showing its position during the packing process.

The larger hoops *h* being driven down, the head H taken out, and the hoops retightened, the butter is packed solid in the tub, while it is standing, as shown in fig. 1; but it is packed only to such a height that when the usual cloth disk and layer of salt, indicated at *e*, is placed on top, there will still remain a space unfilled of about an inch, more or less, according to the tub's taper, between the salt and the inner side of the head when replaced. This space is shown at *s*.

Figure 2:
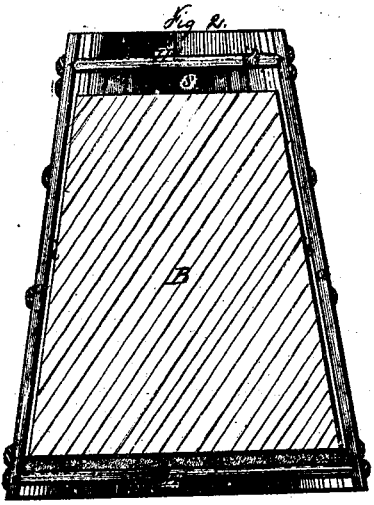
Figure 2 is a similar section, showing the tub in a reversed position after being packed and ready to receive the brine.
Figure 3:
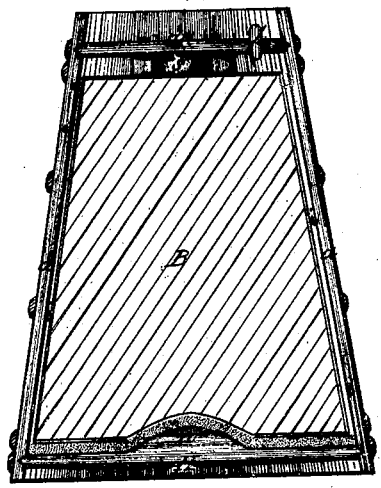
Figure 3 is a like section, exhibiting the cloth-bag lining and large head print.
Figure 4:
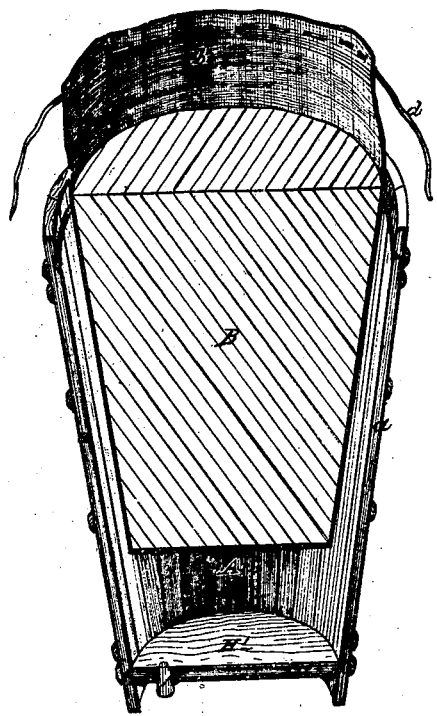
Figure 4 is a half section in perspective, showing the semi-butter cone as partially lifted out from the tub.

When the butter is thus packed, the head is again secured in place, and the tub is turned upside down, so as to stand on its large end, as shown in fig. 2. This operation causes the conical frustum of packed butter, and the salt and cloth layer *e*, to rest upon the large head H, now become the bottom of the tub; said butter, cone, &c., having fallen by gravity a distance equal to the space *e*, and, by reason of the side taper, has produced an annular separation or space, as shown at *i*, between the butter-cone and inner side of the tub.

The plug is now removed, and a properly-prepared brine is poured between the chines, made deeper than usual at the tapered end, which brine runs through the hole into the tub until it fills the spaces *e* and *i* up nearly level with the chine. The air being thus entirely excluded from the butter, and a thin sheet of brine interposed between the butter and the tub, well-made butter may be thus kept for an indefinite period of time as sweet and fresh as when first made.

Should any precautions be deemed necessary to prevent side-shift, especially during transportation, a spherical-shaped protuberance may be made on the follower of the packing-press, not shown, and a similar one, as at *n*, on the large head H, so that the concavity made in the butter may rest on the convexity of the tub-head.

To suit the exigencies of the market I make the tubs of certain graduated sizes, each size containing as nearly as practicable a certain defined weight of butter.

The large retail dealers would probably remove the butter in mass, by first emptying the brine; then by unheading the large head and turning the tub over, it could be lifted clean off from the butter-cone; but for domestic or other use in small quantity at once, I provide a conical-shaped bag of cloth, $b$, that will, on being placed inside the tub, fit exactly against the sides and small head, leaving the large open end of the bag (furnished with a purse draw-string) projecting outside.

When the butter is packed inside to the height in the tub, as hereinbefore provided, the mouth of the bag is drawn together, so as to just cover and lie against that end of the butter-cone, the salt layer is spread over it, and the same treatment given, as before described, without a bag.

In using the butter the mouth of the bag is opened after unheading, and the butter mass can be partially lifted out of the tub, by taking hold of the surplus cloth of the bag, so as to cut out a part of the butter, and the bag containing the remainder lowered again into place. Of course, the annular space of that part of the bag incasing the butter may be kept filled with brine, if desired.

By my construction of tubs a great saving may be effected in transportation, for the reason that both heads being tight, the alternate tubs can be set upon the large and small ends, whereby they can be placed in close contact with each other, no intervening spaces being left.

Claims.

I claim—

1. The method or process of preserving butter, substantially as herein described, consisting, essentially, in packing the butter in reversible conical tubs having tight heads, whereby the mass of butter is allowed an end motion when the tub is reversed, which causes the brine to surround the butter, as set forth.

2. The conical reversible butter-tub A, having tight heads H and H', and furnished with an opening and plug $p$, for the passage of the brine, when employed and manipulated substantially as and for the purpose herein set forth.

3. In combination with the conical reversible tub A, the bag $b$, made and employed substantially as described, for the purpose specified.

CHARLES H. WHITE.

Witnesses:
   GEORGE B. PETERS,
   I. S. PETERS.